US012587015B2

(12) United States Patent
Divan et al.

(10) Patent No.: US 12,587,015 B2
(45) Date of Patent: Mar. 24, 2026

(54) DISPATCHABLE DECENTRALIZED SCALABLE SOLAR GENERATION SYSTEMS

(71) Applicant: Georgia Tech Research Corporation, Atlanta, GA (US)

(72) Inventors: Deepak M. Divan, Atlanta, GA (US); Joseph Benzaquen Sune, Atlanta, GA (US); Zheng An, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 18/726,927

(22) PCT Filed: Jan. 6, 2023

(86) PCT No.: PCT/US2023/060226
§ 371 (c)(1),
(2) Date: Jul. 5, 2024

(87) PCT Pub. No.: WO2023/133501
PCT Pub. Date: Jul. 13, 2023

(65) Prior Publication Data
US 2025/0070562 A1 Feb. 27, 2025

Related U.S. Application Data

(60) Provisional application No. 63/297,422, filed on Jan. 7, 2022.

(51) Int. Cl.
*H02J 3/38* (2006.01)
*H02J 3/32* (2006.01)
(Continued)

(52) U.S. Cl.
CPC *H02J 3/38* (2013.01); *H02J 3/32* (2013.01); *H02J 3/381* (2013.01); *H02J 7/35* (2013.01);
(Continued)

(58) Field of Classification Search
CPC .. H02J 3/38; H02J 3/32; H02J 2300/24; H02J 7/35; H02J 3/381; H02M 7/797;
(Continued)

(56) References Cited

U.S. PATENT DOCUMENTS

2005/0040711 A1* 2/2005 West ...................... H02M 1/10
361/18
2012/0212064 A1 8/2012 Spanoche et al.
(Continued)

OTHER PUBLICATIONS

International Search Report and Written Opinion from Application No. PCT/US2023/060226 dated Jul. 5, 2023.

*Primary Examiner* — Arnold M Kinkead
(74) *Attorney, Agent, or Firm* — TROUTMAN PEPPER LOCKE LLP; Ryan A. Schneider; Stephanie J. Remy

(57) ABSTRACT
An exemplary embodiment of the present disclosure provides a current source converter, comprising a transformer, a first circuit, and a second circuit. The transformer can comprise a first winding, a second winding, and a third winding. The first circuit can be electrically coupled to the first and second windings. The first circuit can comprise a battery port and a photovoltaic (PV) port. The battery port can be configured to interface with one or more batteries. The PV port can be configured to interface with one or more PV modules. The second circuit can be electrically coupled to the third winding. The second circuit can comprise an alternating current (AC) port configured to interface with an AC load.

19 Claims, 11 Drawing Sheets

(51) Int. Cl.
| | |
|---|---|
| *H02J 7/35* | (2006.01) |
| *H02M 1/34* | (2007.01) |
| *H02M 7/48* | (2007.01) |
| *H02M 7/797* | (2006.01) |

(52) U.S. Cl.
CPC ......... *H02M 1/342* (2021.05); *H02M 7/4807* (2013.01); *H02M 7/797* (2013.01); *H02J 2300/24* (2020.01)

(58) Field of Classification Search
CPC .. H02M 1/0058; H02M 1/342; H02M 7/4807; Y02E 10/56
USPC .............. 361/18; 307/82, 52, 23; 363/20, 16
See application file for complete search history.

(56) References Cited

U.S. PATENT DOCUMENTS

| | | | |
|---|---|---|---|
| 2016/0285387 A1 | 9/2016 | Rodriguez et al. | |
| 2020/0021236 A1 | 1/2020 | Pan et al. | |
| 2020/0259362 A1 | 8/2020 | Lai et al. | |
| 2021/0273574 A1 | 9/2021 | Zheng et al. | |

* cited by examiner

DISPATCHABLE DECENTRALIZED SCALABLE SOLAR GENERATION SYSTEMS

CROSS-REFERENCE TO RELATED APPLICATIONS

This application is a § 371 National Stage of International Patent Application No. PCT/US2023/060226, with an international filing date of 6 Jan. 2023, which International Patent Application No. PCT/US2023/060226 claims priority to U.S. Provisional Application Ser. No. 63/297,422, filed 7 Jan. 2022, each of which is hereby incorporated by reference in its entirety as if fully set forth below.

FIELD OF THE DISCLOSURE

The various embodiments of the present disclosure relate generally to solar generation systems, and more particularly to dispatchable decentralized scalable solar generation systems.

BACKGROUND

As we move towards increased penetration of solar energy on the grid, it is important that grid integrated PV become easier to install and commission and provide much higher value through grid services and dispatchability. Today the building block is a simple PV solar panel, typically rated at 300-500 watts, which is then interconnected to realize different DC voltage levels. Strings are connected in series in the field to realize voltages of up to 1500 volts DC. These PV strings are then interconnected using combiner boxes to realize higher currents and power levels and are then connected to the grid with a DC/AC inverter. The entire system is custom-designed, with "Balance of System" costs, including system design, civil costs, labor costs, protection, isolation and sensing, being significantly higher than the cost of the power inverters (and in some cases, the PV panels themselves). In addition, PV inverters do not represent dispatchable power. To achieve dispatchability, energy storage has to be added in, again with an inverter (or isolated dc/dc converter), as well as protection and controllers to locate and coordinate. Advanced grid services or coordination with the grid operator represents an additional layer of complexity, including communications, cybersecurity, and compliance with required protocols. Finally, there is an additional sensing, analytics, and maintenance support layer that is required. All these elements severely restrict the scalability and the rapid deployment of such large-scale systems. In spite of this, deployment of PV systems and systems with integrated energy storage, have exploded with demand of 100+ GW/year, but projects are being delayed by as much as 3-4 years. Further, existing solutions are hard-pressed to provide advanced grid services such as inertial support, black-start, and grid-forming capability—functions that today can require deep coordination with the grid operator. This suggests that there is an opportunity for a different approach that realizes a dispatchable and scalable PV-based generation resource that is cost-effective and rapidly scalable to any level.

The complexity and customization described above constrains the ability to rapidly scale deployment. As discussed above, this has created a massive pipeline of projects that are in the queue for design and grid interconnection validation, with waits in multiple years quite common. When one considers that the technology itself has a steep learning rate and is moving very fast, typically in two-year cycles, it becomes clear that system implementation complexity only increases as multiple technology generations need to be integrated together in terms of inter-unit and grid coordination. There is a need for a plug-and-play solution for a dispatchable PV generation resource that guarantees interoperability across a wide range of applications and over multiple technology generations and years, and which is easy to install, commission, and safely maintain across many different operating environments. Such capability is not available today and is desirable if global goals of decarbonization are to be achieved.

One can think of an older generation of inverters as being generally plug-and-play, raising the question about why they would not meet the requirements being described here. Rooftop panels were connected to the grid using inverters, as were larger utility-scale PV farms. The earliest generation of inverters typically operated to deliver maximum power possible to the grid under all operating conditions—often using a maximum peak power tracking (MPPT) control strategy, as financial compensation was based on energy (watt-hours) delivered. In such a case, each inverter could operate independently of other inverters and simply use the grid as a "template" to push power with a desired frequency and unity power factor. As inverter penetration on the grid increased, inverters were required to stay connected to the grid under transient or fault conditions—which resulted in new requirements for VAR support, low-voltage-ride-through (LVRT), unbalanced operation, and zero-voltage-ride-through (ZVRT). The vast majority of inverters deployed, including those deployed on rooftops, operate in such a "grid-following" mode, and thus appear to operate "autonomously." They are, however, very restricted in functionality, only able to operate and deliver power to the grid when it is present and in good health.

As the penetration of inverters on the grid further increased, grid operators were looking to use the inverters to balance the grid and provide grid services, such as VARs, frequency regulation, and inertia support. In case of congestion, grid operators were looking to curtail PV power. Further, when additional power was desired beyond what the PV panels could supply at that instant, there was no way to achieve that—this required energy storage, such as with batteries, as well as additional inverters. Further, galvanic isolation was desired to ensure safety grounds and to minimize panel degradation. To provide grid-forming and black-start capability, it was also desirable for these inverters to be grid-forming—technology that was not widely available or deployed. PV farms (of whatever size) serving as grid resources thus needed PV, energy storage, inverters to connect these DC devices to the AC grid, need for galvanic isolation to ensure safety and ability to manage failure mechanisms, communications with the grid operator, manage all transients and faults autonomously, and the ability to provide an array of grid services. In addition, energy storage became a critical piece of this puzzle, because a renewable rich future grid required large levels of energy storage. FIG. 1 shows a layout for a possible 20 MW conventional PV farm, including energy storage. This shows the complexity of building a large-scale PV farm.

Today, the energy storage function is typically done using batteries. Lithium-ion batteries, driven by rapid adoption in the EV sector, have provided an acceptable alternative as prices were rapidly approaching levels that were economically viable. The batteries and packages being developed needed to be light and compact to meet automotive requirements—which necessitated the use of active cooling, mechanical bracing, and the need to accommodate DC fast charging. The same battery structures were adapted for use in ground-based applications. To achieve the storage levels required on the bulk system needs, 100's of megawatts of energy storage deployed, often in large utility-scale PV farms. This is being done widely and with systems at $32/MWHr, including the PV and 4 hours of storage, well under normal fossil-based generation cost. The energy storage system is typically implemented in airconditioned temperature-controlled containers that store up to 1 MWHr of energy in a highly dense form factor. The batteries are series-connected in strings at 600-1000 VDC, with extensive battery management systems that ensure that individual cell voltages are not exceeded, and that individual cells do not thermally overheat. A typical 1 MW system may have 40,000 individual cells that need to be monitored, which is challenging. What is done instead is monitoring at a sub-pack level—say 12 volts, with an assumption that all cell conditions are known. With the tight packaging and the high power and energy densities needed, this can result in local overheating. At best, this results in a throttling of the battery capacity (if it is detected). At worst, this results in thermal runaway and a battery fire that is difficult to manage. There have been many battery-storage fires that pose a safety hazard and generate significant negative publicity, especially when deployed in congested urban areas.

One can see the resulting complexity and cost of the overall system can be very high and poses significant challenges, which in turn limits scaling capability. Implementation requires significant technical expertise in the design, construction, commissioning, operation, and maintenance of the facility—which adds to the overall cost. As many of these projects have economics based on 20-year life cycles, it also creates a hidden cost—that of maintaining expertise to operate the system, and obsolete parts and components to replace failed elements. It also requires the continuity of obsolete systems (power electronics, communications, and controls) that have two-year cycles. As costs of similar and competing solutions become lower, driven by a steep learning rate, the economic viability of the project is challenged, potentially leading to stranded assets (e.g., 'peaker' gas plants). This adds tremendously to the complexity and cost of implementation and creates uncertainty that the full economic value will be realized. It is clear that an alternate approach is needed.

Accordingly, to realize the benefits of scalability for PV solar systems at virtually any level (few kilowatts to >100 MW), a modular plug-and-play building block is desired—one that can implement all grid services at any scale. This includes full dispatchability, ability to follow or form grids, ability to connect to or to form a microgrid, and the ability to support the grid in normal, transient, and fault conditions. The modules should be easy to deploy, should have high availability, and should allow a high level of interoperability in the face of rapid technology migration. It is desirable for modules to be able to operate autonomously, meeting all real-time operation requirements in grid-connected or microgrid-mode, and able to coordinate and optimize system-level performance through low-latency communications, when it is available. It is also desirable for the modules to have the ability to locate and protect against faults and failures, to minimize the impact of failed modules on the system, and the ability to quickly repair and commission systems without a highly trained technical workforce. Finally, it is desirable for the modules and the system to be intrinsically safe, without issues of dangerous voltages that can be accessed by maintenance and repair crew, or issues of thermal runaway and massive fires that have resulted in many high-power battery-based systems.

There have been several attempts at integration of the various elements in PV systems. The use of microinverters rated at around 200 watts, that are mounted on the PV panel, have been available commercially for many years, and meet the basic need of universal connectivity. Microinverters take the DC-voltage available from the panel and convert it to AC, allowing direct connection to the AC-line. Microinverters have traditionally operated in grid-following mode only, although recent microinverters claim grid-forming functionality using surplus power that may be available at the PV panel level. The challenges of integrating energy storage at the PV panel level have not seen a solution that has been considered to be economically viable. As a result, currently available microinverters cannot meet the requirements outlined above. However, this cannot be integrated with energy storage, and thus cannot provide the advanced functions that are the key to true scalability and economic viability.

Moving away from the central plant-level energy storage concept, the idea of a more distributed tri-port configurations at a sub-plant level has also been proposed. FIG. 2 shows PV hybrid farm configuration that utilizes a medium-voltage string inverter which connects to 1000 VDC PV strings at 300 kW and integrates an energy storage module. Although simpler than the centralized concept in FIG. 1, this still requires a significant level of customization, a DC collection system, and requires that replacement components be available for the life of the plant. Further, this cannot be reduced down to smaller systems easily. Accordingly, there is a desire for an even simpler approach, which is provided by the present disclosure.

BRIEF SUMMARY

An exemplary embodiment of the present disclosure provides a current source converter, comprising a transformer, a first circuit, and a second circuit. The transformer can comprise a first winding, a second winding, and a third winding. The first circuit can be electrically coupled to the first and second windings. The first circuit can comprise a battery port and a photovoltaic (PV) port. The battery port can be configured to interface with one or more batteries. The PV port can be configured to interface with one or more PV modules. The second circuit can be electrically coupled to the third winding. The second circuit can comprise an alternating current (AC) port configured to interface with an AC load.

In any of the embodiments disclosed herein, the converter can be configured to operate in a plurality of modes to allow electrical energy to flow between one or more of the battery port, the PV port, and the AC port and another of the battery port, the PV port, and the AC port.

In any of the embodiments disclosed herein, the plurality of modes can comprise a first mode in which electrical energy is transferred from the PV port to the battery port.

In any of the embodiments disclosed herein, the plurality of modes can comprise a second mode in which electrical energy is transferred from the PV port to the AC port.

In any of the embodiments disclosed herein, the plurality of modes can comprise a third mode in which electrical energy is transferred from the battery port to the AC port.

In any of the embodiments disclosed herein, the plurality of modes can comprise a fourth mode in which electrical energy is transferred from the AC port to the battery port.

In any of the embodiments disclosed herein, the battery port can be configured to operate a voltage level of no more than about 48V.

In any of the embodiments disclosed herein, the AC port can be a single-phase AC port.

In any of the embodiments disclosed herein, the AC port can be a three-phase three-wire AC port.

In any of the embodiments disclosed herein, the AC port can be a three-phase four-wire AC port.

In any of the embodiments disclosed herein, the first circuit can further comprise a plurality of bidirectional switches.

In any of the embodiments disclosed herein, the bidirectional switches can be silicon carbide switches, silicon switches, gallium nitride switches, or combinations thereof.

In any of the embodiments disclosed herein, the bidirectional switches can be configured to operate in a reverse blocking mode.

In any of the embodiments disclosed herein, the plurality of bidirectional switches can comprise a second bidirectional switch serially connected to the first transformer winding and the battery port, and the converter can be configured to cause electrical energy to flow from the battery port to the first winding during a switching cycle when the second bidirectional switch is in a closed position.

In any of the embodiments disclosed herein, the plurality of bidirectional switches can comprise a first bidirectional switch serially connected to the second transformer winding and the battery port, and the converter can be configured to cause electrical energy to flow from the second transformer winding to the battery port during a switching cycle when the first bidirectional switch is in a closed position.

In any of the embodiments disclosed herein, the plurality of bidirectional switches can comprise a third bidirectional switch serially connected to the first transformer winding and the PV port, and the converter can be configured to cause electrical energy to flow from the PV port to the first winding during a switching cycle when the third bidirectional switch is in a closed position.

In any of the embodiments disclosed herein, the first circuit can further comprise a clamping circuit configured to discharge leakage energy from the transformer.

In any of the embodiments disclosed herein, the first circuit can further comprise an energy recovery circuit connected in shunt with the clamping circuit.

In any of the embodiments disclosed herein, the first circuit can further comprise an energy recovery circuit configured to recover the discharged leakage energy to the battery port.

In any of the embodiments disclosed herein, the second circuit can further comprise a plurality of half bridge branches, in which each of the half bridge branches can comprise a first reverse blocking switch and a second reverse blocking switch.

In any of the embodiments disclosed herein, the second circuit can further comprise an output capacitive/inductive ("CL") filter in parallel with the AC port, in which the output capacitive filter can be configured to allow the AC port to interface with the AC load.

In any of the embodiments disclosed herein, the transformer can have a first, second, and third winding ratio of N1: N1: N2.

Another embodiment of the present disclosure provides a method of operating a current source converter. The current source converter can comprise a transformer having first, second, and third windings, a first circuit electrically coupled to the first and second windings and comprising a battery port and a photovoltaic port, and a second circuit electrically coupled to the third winding and comprising an AC port. The method can comprise: transferring electrical energy from the battery port to the AC port; transferring electrical energy from the PV port to the AC port; and transferring electrical energy from the PV port to the battery port.

In any of the embodiments disclosed herein, the method can further comprise transferring electrical energy from the AC port to the battery port.

In any of the embodiments disclosed herein, transferring electrical energy from the battery port to the AC port can comprise implementing a switching cycle comprising closing a second bidirectional switch serially connected between the battery port and the first winding.

In any of the embodiments disclosed herein, transferring electrical energy from the PV port to the AC port can comprise implementing a switching cycle comprising closing a third bidirectional switch serially connected between the PV port and the first winding.

In any of the embodiments disclosed herein, transferring electrical energy from the PV port to the battery port can comprise implementing a switching cycle comprising closing a third bidirectional switch serially connected between the PV pot and the first winding and closing a first bidirectional switch serially connected between the battery port and the second winding.

In any of the embodiments disclosed herein, the method can further comprise discharging, with a clamping circuit of the first circuit, leakage energy from the transformer.

In any of the embodiments disclosed herein, transferring the discharged leakage energy from the transformer to the battery port can comprise implementing an energy recovery circuit.

These and other aspects of the present disclosure are described in the Detailed Description below and the accompanying drawings. Other aspects and features of embodiments will become apparent to those of ordinary skill in the art upon reviewing the following description of specific, exemplary embodiments in concert with the drawings. While features of the present disclosure may be discussed relative to certain embodiments and figures, all embodiments of the present disclosure can include one or more of the features discussed herein. Further, while one or more embodiments may be discussed as having certain advantageous features, one or more of such features may also be used with the various embodiments discussed herein. In similar fashion, while exemplary embodiments may be discussed below as device, system, or method embodiments, it is to be understood that such exemplary embodiments can be implemented in various devices, systems, and methods of the present disclosure.

BRIEF DESCRIPTION OF THE DRAWINGS

The following detailed description of specific embodiments of the disclosure will be better understood when read in conjunction with the appended drawings. For the purpose of illustrating the disclosure, specific embodiments are shown in the drawings. It should be understood, however, that the disclosure is not limited to the precise arrangements and instrumentalities of the embodiments shown in the drawings.

DETAILED DESCRIPTION

Figure 1:
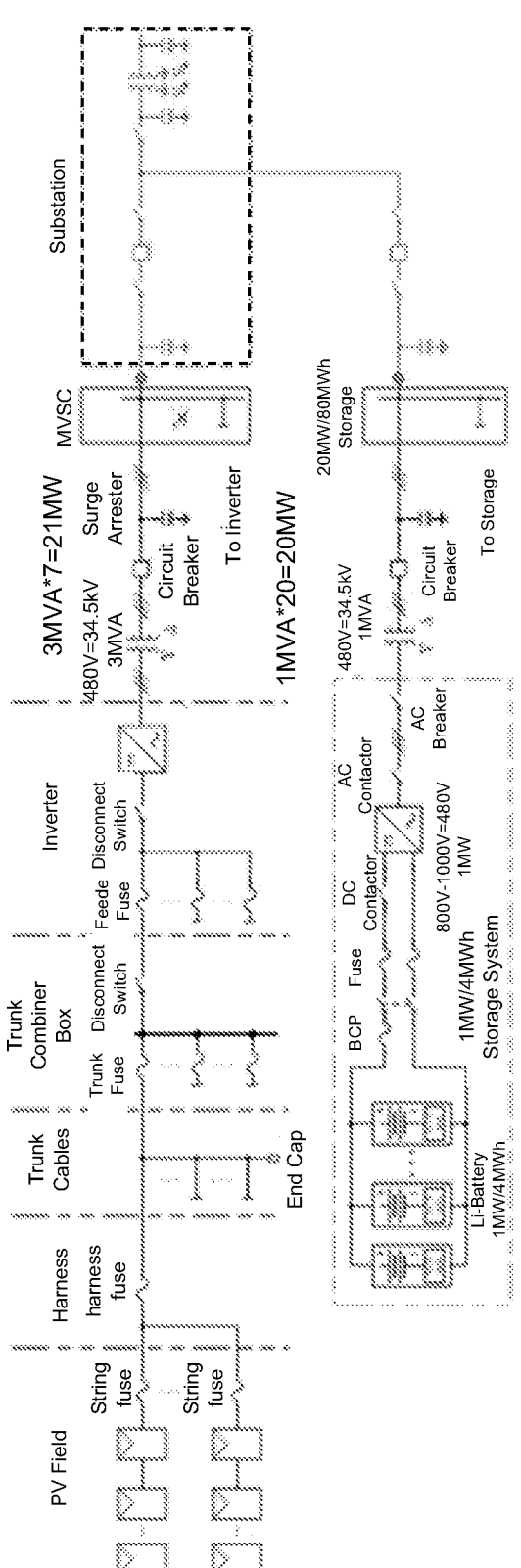
FIG. 1 provides a schematic layout of a hybrid photovoltaic farm, in accordance with an embodiment of the present disclosure.

To facilitate an understanding of the principles and features of the present disclosure, various illustrative embodiments are explained below. The components, steps, and materials described hereinafter as making up various elements of the embodiments disclosed herein are intended to be illustrative and not restrictive. Many suitable components, steps, and materials that would perform the same or similar functions as the components, steps, and materials described herein are intended to be embraced within the scope of the disclosure. Such other components, steps, and materials not described herein can include, but are not limited to, similar components or steps that are developed after development of the embodiments disclosed herein.

Disclosed herein is a dispatchable decentralized solar generation system with advanced grid support, grid-forming and microgrid functionality, which is referred to herein as "Solar Grid," that can be built using multiple (a few to many thousands) "Solar Gen" devices to realize systems rated from a few kilowatts to hundreds of megawatts. "Solar Gen" is a scalable building block at the PV panel level that can integrate a PV panel, integrated energy storage, a tri-port converter, communications, and controls to realize the advanced functionality that enables a highly-scalable rapidly-deployable easily-maintainable technology-agnostic plug-n-play system design. A goal of the Solar Grid systems is to eliminate/reduce the customization of the electrical and system design and build at the plant-level that is normally needed to implement a large system. The modular system, along with its architecture and interface specifications provide a high degree of interoperability, even in the face of technology migration, and provides a flexible building block to meet a wide variety of the emerging needs for a renewable rich future grid.

To achieve the desired Solar Grid functionality, "Solar Gen" can be used as the basic building block. Each Solar Gen can include the PV panel and a single tri-port converter box that is mounted on or integrated with the PV panel (preferably on the backside of the panel in the shade), where the tri-port converter box can include the energy storage battery, as well as communications, controls, and protection elements to achieve the desired functionality and flexibility. Target power for these panels is anticipated to be around 250-500 watts, but the disclosure is not so limited, and, as those skilled in the art would understand, the systems disclosed herein can be modified to many different power levels. The tri-port converter, which is discussed in more detail below, can have at least two DC ports that connect to the PV panel and to the battery, and also features AC inverter functionality, which for the third port, allows direct connection to the AC-grid at the available AC voltage (such as 240 volts single phase or 480 volts 3 phase). Moreover, the controller can include the ability to, autonomously and in real-time, control the bi-directional power flows between the PV panel, battery, and grid. The controller can also provide for advanced controls such as grid-forming mode, power-dispatch mode when grid-connected, fault-ride-through, grid support, self-synchronization with the grid, providing varying levels of inertia support as needed, and in autonomous power-frequency droop mode when operating as a grid-independent microgrid. Exemplary ratings for the AC Panel could be 350 watts, 277 volts AC single phase or 480 volts 3-phase, and 1.3 kWHr of energy storage, though many other ratings are contemplated within the scope of embodiments of the present disclosure. Each grid-connected tri-port can also be fully protected at the AC-side, as well as the DC-side.

Figure 2:
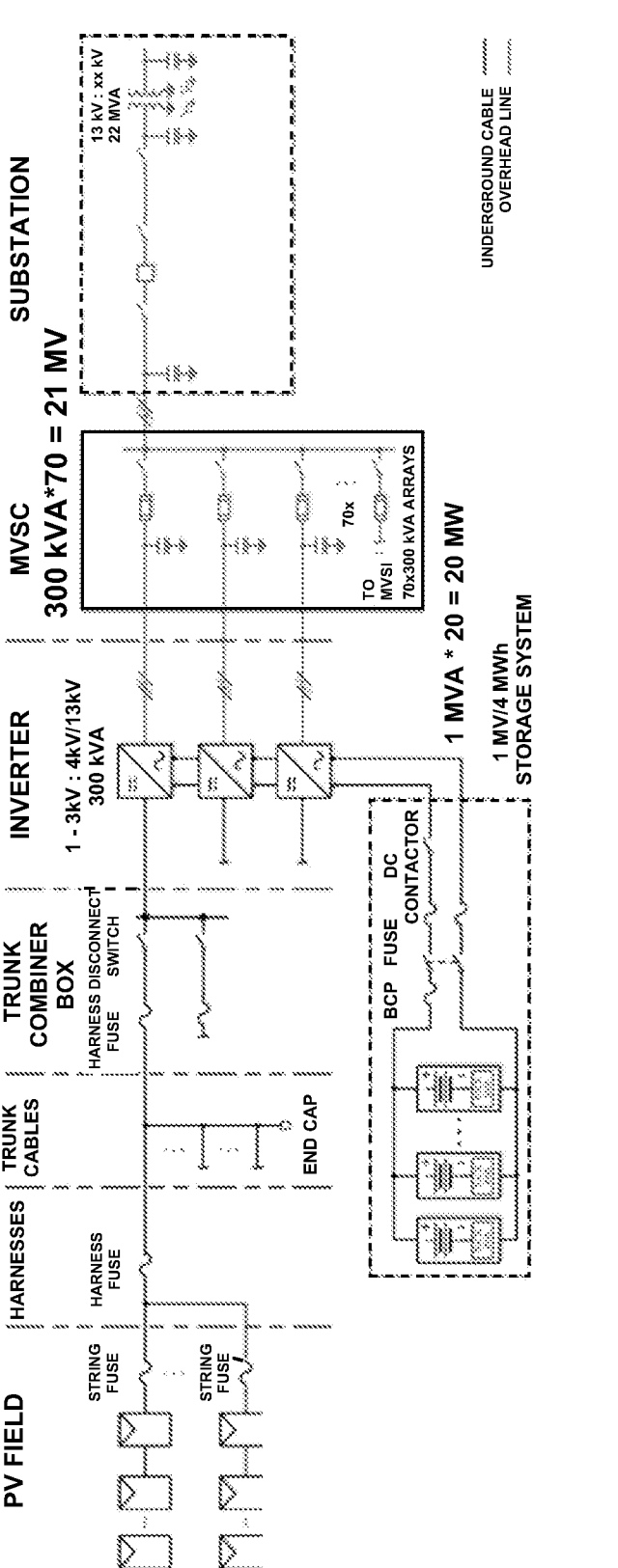
FIG. 2 provides a schematic of a hybrid photovoltaic farm implementing medium voltage muti-port string inverters, in accordance with an embodiment of the present disclosure.

In a traditional PV farm, power is distributed from a high-voltage substation using medium-voltage lines to transformers (1-4 MW for central inverters and 150 kW for string inverters). The DC/AC inverters, typically optimized for efficiency, convert 1000 VDC to 1500 VDC from the PV panels to 480 volts AC, which is then stepped up with the medium-voltage transformer. The DC from the PV strings is laid out specifically with DC collector buses, combiners, sensing, and protection. As discussed earlier, this is all very customized and expensive. Examples are shown in FIGS. 1 and 2.

Figure 3A:
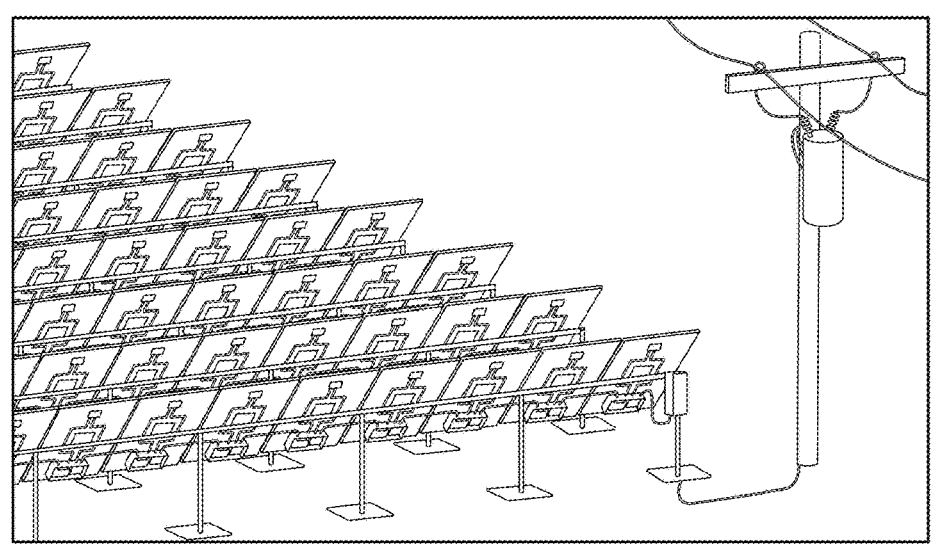
FIG. 3A illustrates an exemplary Solar Gen AC architecture.

Solar Grid can follow a more traditional radial AC distribution grid architecture and may not involve any custom elements. Medium-voltage power can be distributed from the high-voltage substation down, using poles and wires (or underground). As in the case of a residential or commercial feeder, transformers on poles (or concrete pads) rated at 50-150 kW can be connected to the MV line with fusible disconnects, and step down the voltage to a standard AC voltage (240, 480, or 575 volts AC). This is a very scalable and cost-effective method of distributing large amounts of power to many points. An example of a Solar Grid distribution arrangement is shown in FIG. 3A.

Figure 3B:
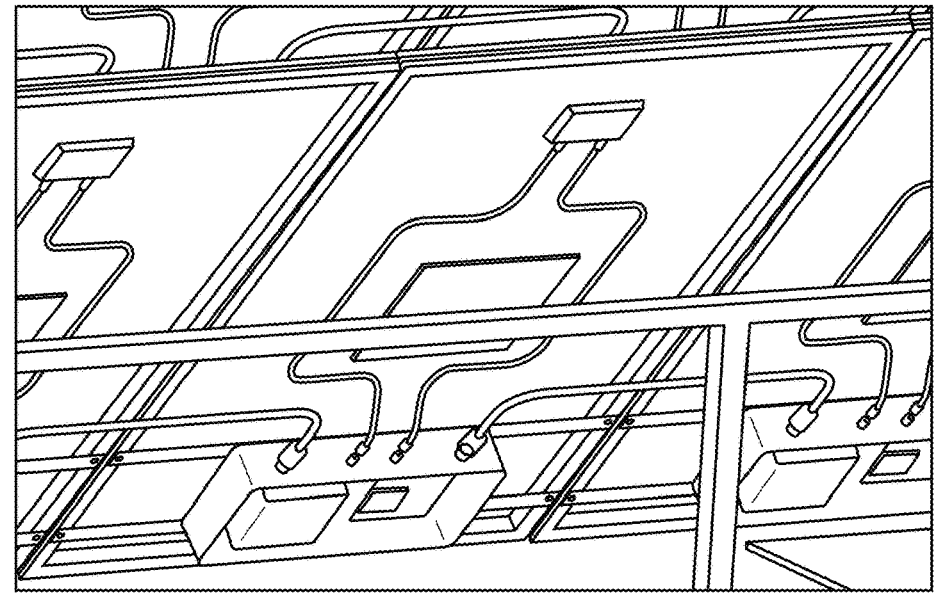
FIG. 3B illustrates an exemplary Solar Gen tri-port converter using a daisy chain, in accordance with embodiments of the present disclosure.
Figure 4:
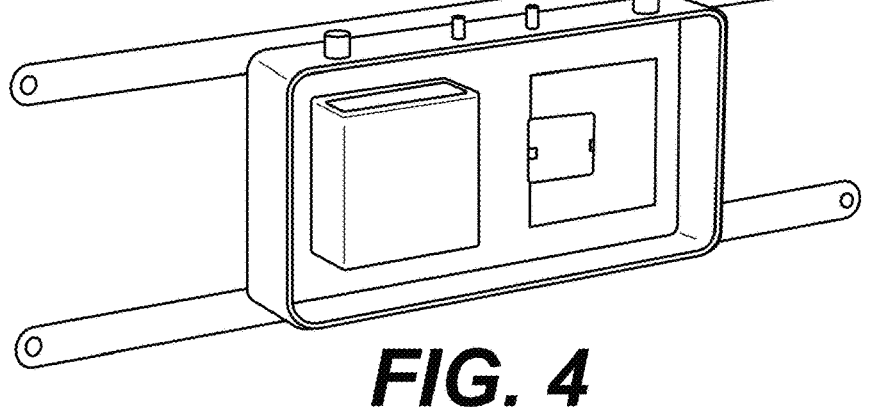
FIG. 4 provides a rendering of a Solar Gen tri-port converter, in accordance with an exemplary embodiment of the present disclosure.

In some embodiments, a Solar Grid system can be built using multiple Solar Gen (see FIG. 4) units racked on a mounting bracket (as shown in FIG. 3B), with each unit connected in parallel to the AC line, using a daisy-chain connection process with a cost-effective all-weather connection plug-socket or other arrangement known in the art. An alternate approach could use an AC-cable with taps to feed each Solar Gen. An example would be 30 Amperes at 480 volts 3 phase AC, which would give a maximum continuous power of 25 KW per PV string. Six such strings could generate 150 KW and could define a "scalable cell" for the PV farm. Assuming a 250 Ampere limit for a 13 kV feeder gives a maximum power per line of >5 MW, a number which could be doubled by doubling the number of conductors or increasing its ampacity. This "standard cell" could be replicated as needed and shows the ease with which the system could be scaled.

As discussed above, the integration of the energy storage element right at the panel level in some embodiments of the Solar Gen is a major deviation from many conventional centralized systems. A centralized battery storage system can require complex monitoring, thermal management, and active cooling, which all add to the cost. The decentralized form factor that can be provided by Solar Gen can eliminate the need to build a high-power, high-voltage DC battery system and can also eliminate concerns of protection, thermal runaway, and fire-hazard. It can also improve return energy efficiency, because as much as 20% of the energy can typically be lost in the BMS process with high-voltage battery strings under fast charge/discharge conditions. For achieving safety in the field, the battery and PV panel both can operate at an intrinsically safe voltage, such as 48 volts DC and can be connected to the low voltage side. The energy dissipation in a 48 volt 1.5 kWHr cell that could be used in Solar Gen can be minimal and can be passively managed because space is not as tightly constrained as in the centralized system. Local intelligence and a battery monitoring system (BMS) can manage the integrated battery, so that it operates within its design specifications. The low battery voltage can also make it easy to ensure that the batteries see uniform thermal loading, which can simplify the BMS needs and dramatically reduce losses caused due to traditional BMS during fast charging and discharging of high voltage battery packs and increases energy throughput for the entire plant. The low voltage of the battery and the PV panel also can allow the design of the module in such a way that the battery can be exchanged in the field by a low-skill technician if needed. The low voltage PV panel also can reduce the need to design the panels to withstand 1500 VDC, as they are conventionally designed for, and can eliminate a major degradation mechanism. This approach also can improve the reliability and life of the battery. The battery and PV panel together, in conjunction with the tri-port converter, can provide all the functionality for grid services, grid support, and grid formation.

Figure 5A:
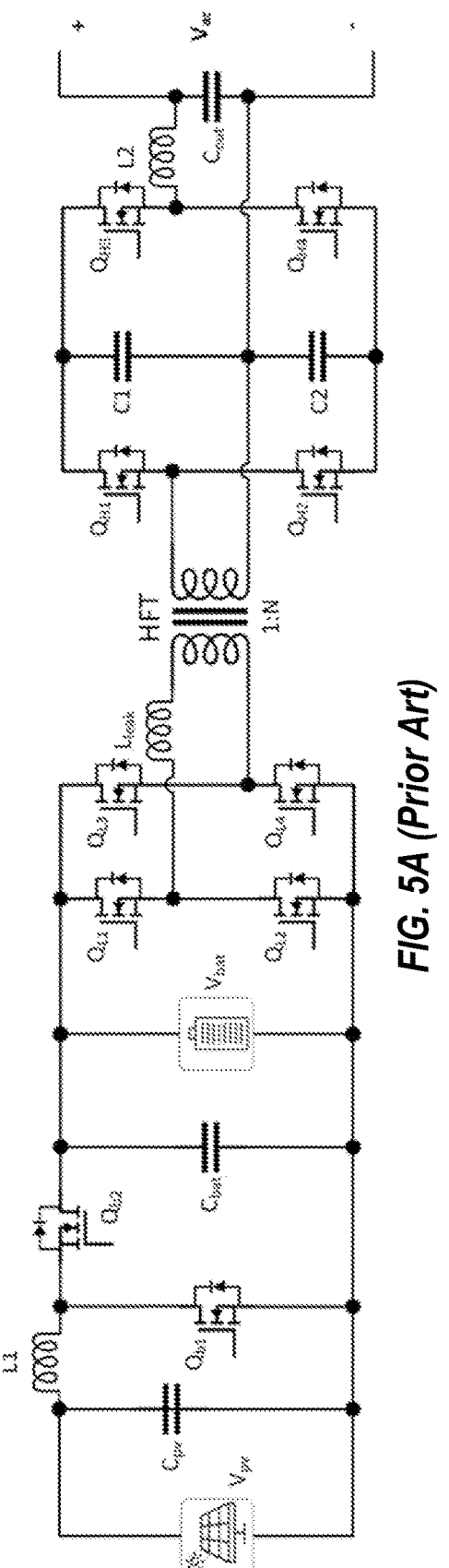
FIGS. 5A-B provide schematics of conventional multi-converter implementations with a dual active bridge HF link.
Figure 5B:
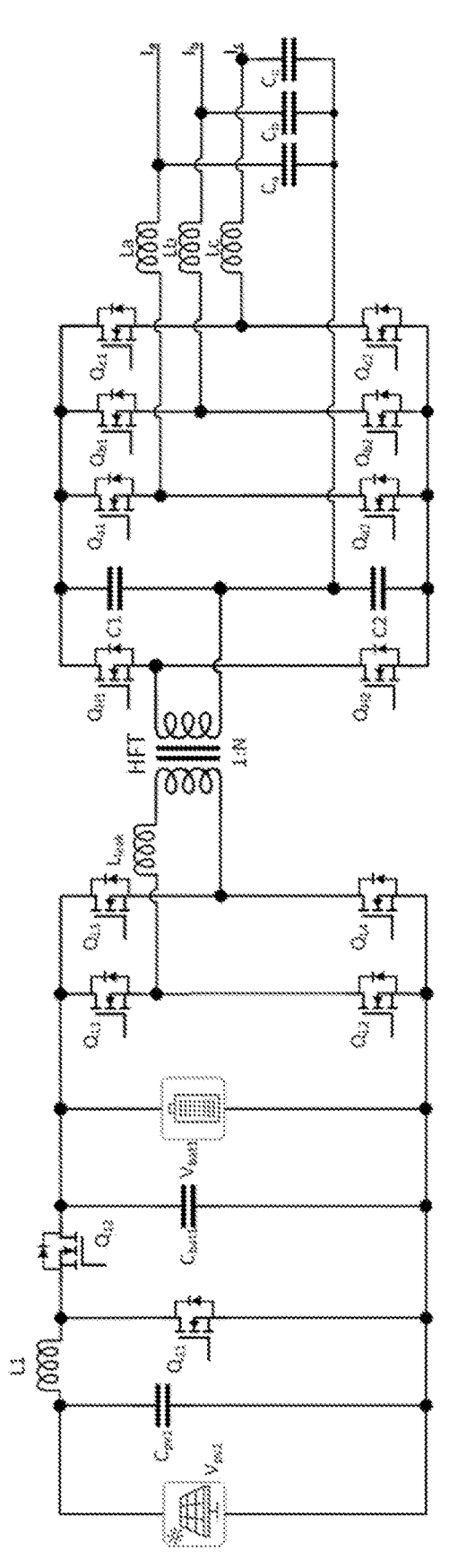

To realize the functionality, disclosed above, two distinct approaches can be considered. One could use a microinverter for the PV to grid power flow control function and could add a second "box" that could include the battery, a bidirectional DC/DC converter with high-frequency isolation, and a DC/AC inverter to connect to the grid. Examples are shown in FIGS. 5A-B, with Dual Active Bridge (DAB) converters used for HF isolation, along with a DC/AC inverter for grid connection. This approach could add significantly to the cost of the system, as this would be in addition to the PV inverter, which would also employ another inverter, again with HF isolation.

Accordingly, an integrated tri-port converter, which could simultaneously manage power flows between the PV panel, battery and grid, and could do so while meeting all the other operational requirements described above, would present an attractive solution. Conventional systems do not provide such a solution, because traditional methods for implementation are too expensive and would not be viable.

Figure 6:
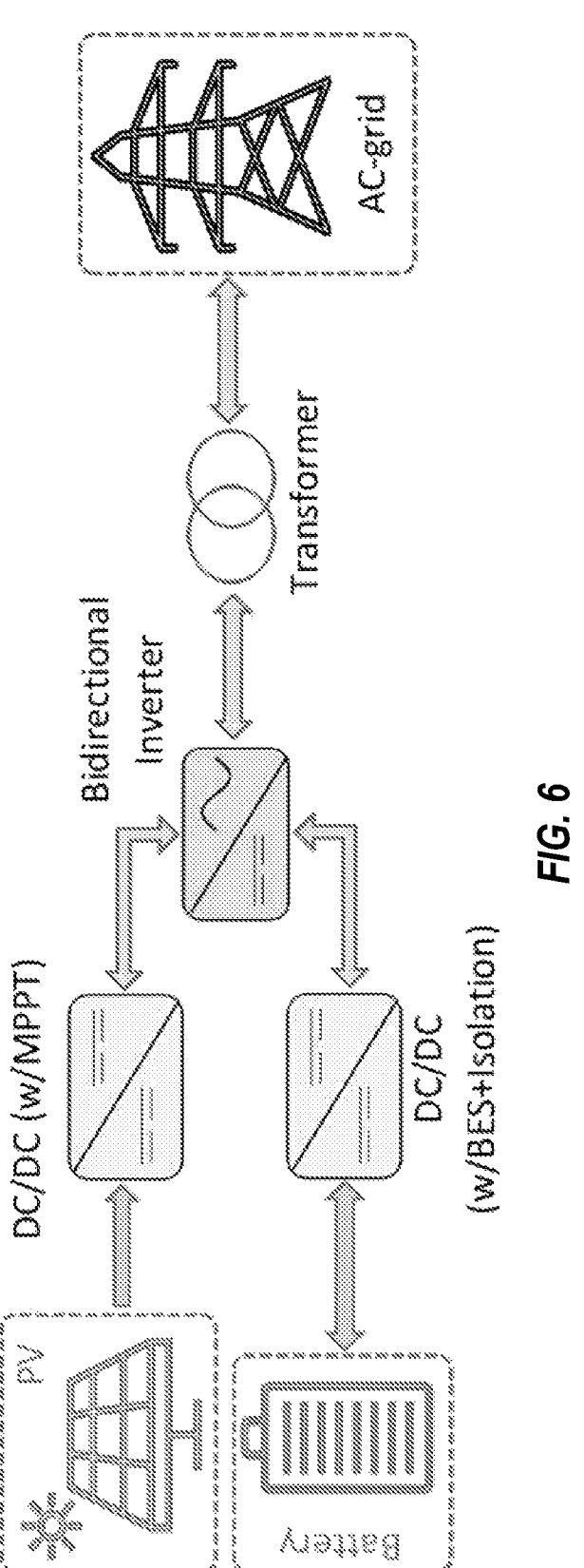
FIG. 6 provides a single line diagram of functionality of a tri-pot converter, in accordance with an exemplary embodiment of the present disclosure.

FIG. 6 shows a single-line diagram of an exemplary tri-port converter that connects to a 48 volt PV panel and a 48 volt battery on the DC-side, and to 1 phase or 3 phase AC on the AC-side. As discussed above, this can be done using multiple converters, all having DC/DC converters to interface the battery and PV panel, another DC/DC converter to convert the low voltage to high DC voltage with galvanic isolation, and finally, an inverter (typically a voltage source inverter) to convert the DC to AC and to connect to the grid. Filtering and EMI suppression are used in addition to protection, synchronization, and fault ride-through. Stable operation of such VSIs in poorly known and changing multi-converter environments continues to be a challenge that is not fully resolved.

Figure 7:
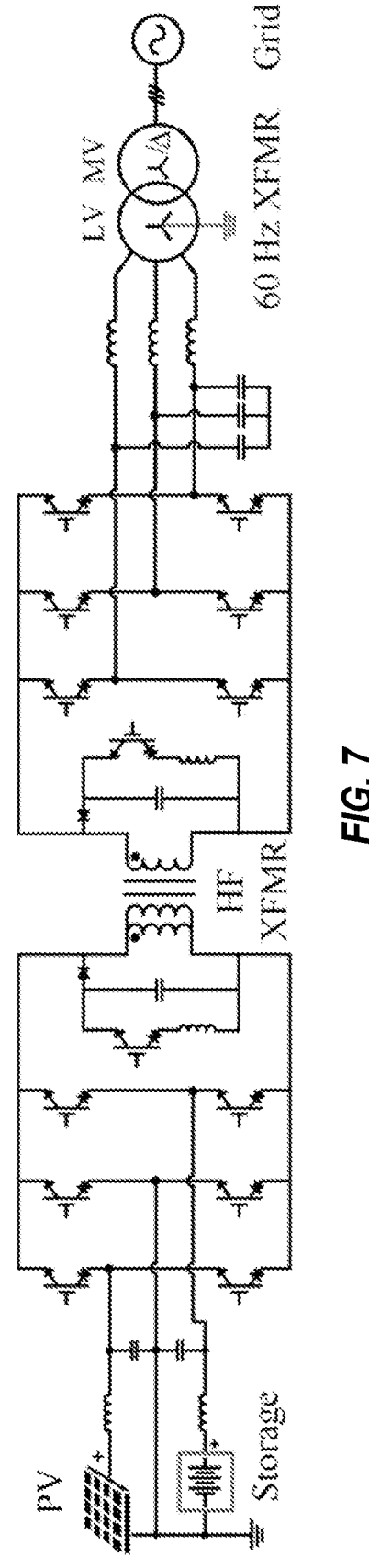
FIG. 7 provides a schematic of a conventional medium voltage multi-port soft-switching solid-state transformer with a PV port, battery port, and AC port configuration.

Recent multiport converters such as the S4T (including the AC-Cube implementation), see FIG. 7, offer a promising alternative due to the integrated tri-port function and current source characteristic that promises improved controllability of parallel converters. On the other hand, this can also require a high switch count, and two resonant switches and tanks that are challenging to implement on the low-voltage side.

Figure 8A:
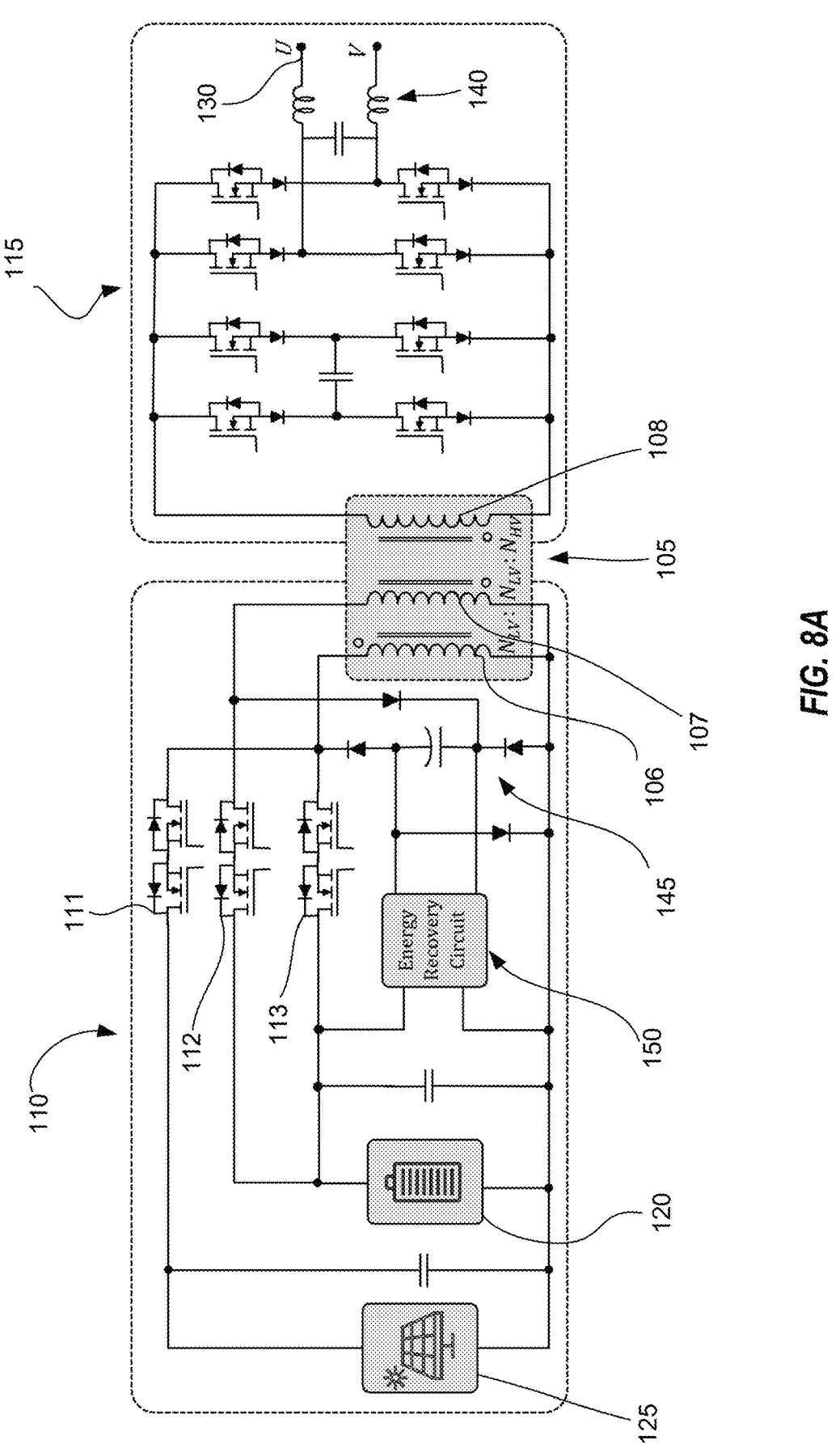
FIGS. 8A-B provide schematics of a Solar Gen tri-port converter with a single-phase output and three-phase output, respectively, in accordance with exemplary embodiments of the present disclosure.
Figure 8B:
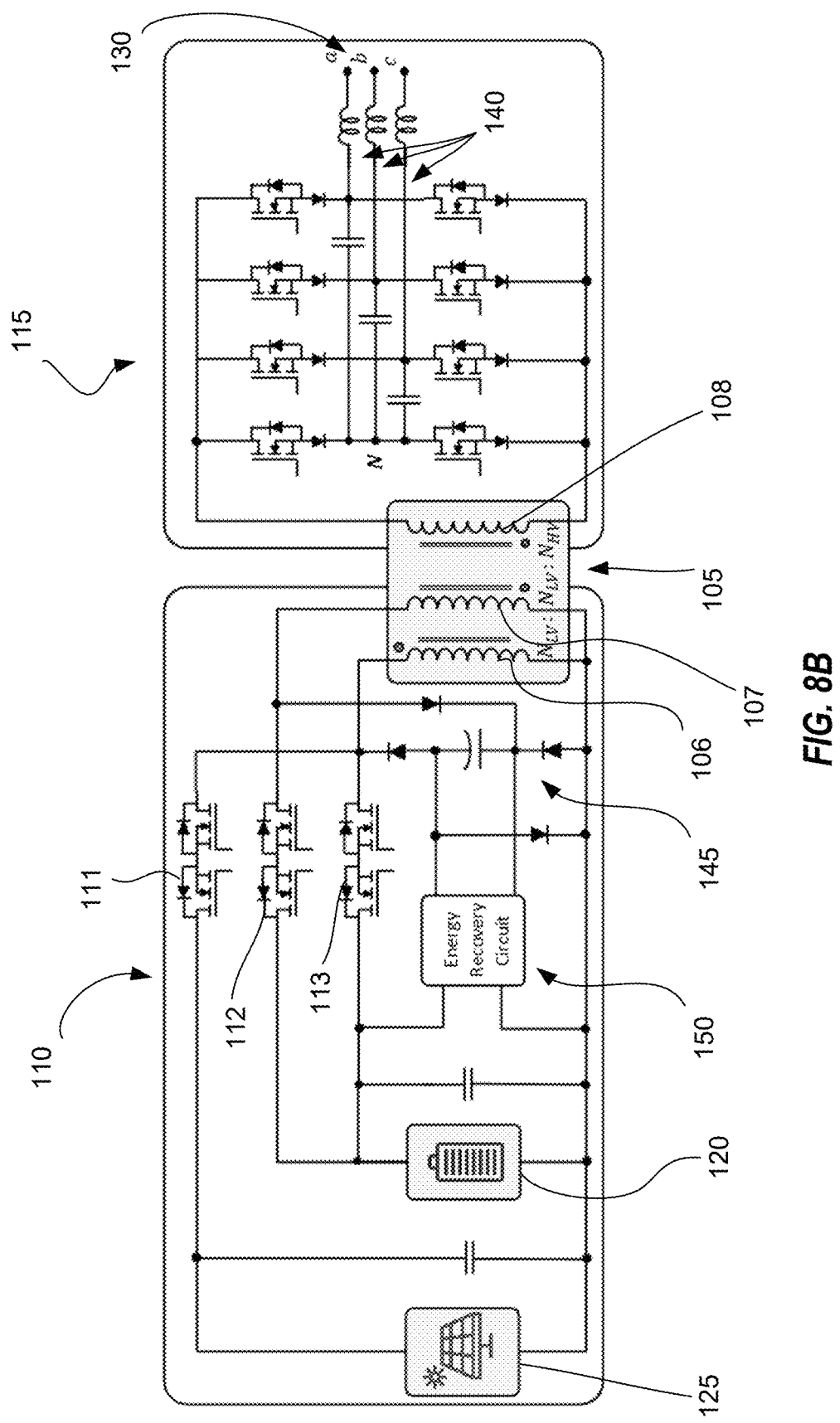

Various embodiments of the present disclosure provide current source converters to address these shortcomings while achieving the desired tri-port functionality. Exemplary converters are shown in FIGS. 8A-B. FIG. 8A provides a diagram for a current source converter with a single-phase AC output circuit, while FIG. 8B provides a diagram for a current source converter with a three-phase AC output circuit.

The current source converter can comprise a transformer 105, a first circuit 110, and a second circuit 115. The transformer 105 can be many transformers known in the art. The transformer 105 can comprise multiple windings. For example, as shown in FIGS. 8A-B, the transformer can comprise a first winding 106, a second winding 107, and a third winding 108. The windings 106 107 108 can have various winding ratios. In some embodiments, the transformer 105 can have a first, second, and third winding ratio of 1:1: N.

The first circuit 110 (also sometimes referred to as a DC circuit or input circuit) can be electrically coupled to transformer 105. As shown in FIGS. 8A-B, the first 106 and second 107 windings can be electrically coupled to the first circuit 110. The first 110 and second 115 circuits can comprise one or more ports (i.e., electrical interfaces electrical equipment/systems, such as batteries, PVs, generators, loads, networks, etc. As shown in FIGS. 8A-B, the first circuit 110 can comprise a battery port 120 and a PV port 125. The battery port 120 can be configured to interface with one or more batteries. The PV port 125 can be configured to interface with one or more PV modules.

The PV port 125 and battery port 120 can be electrically coupled to the transformer 105 via one or more switches 111 112 113. The switches can be many different switches known in the art. In some embodiments, the switches can be bidirectional switches. In some embodiments, the bidirectional switches can be configured to operate in a reverse blocking mode. The bidirectional switches can be realized with silicon or any wide bandgap semiconductions, including, but not limited to, silicon carbide, gallium nitride, and the like. Wide band gap devices can minimize any potential for reverse recovery currents that can lead to voltage spikes, excessive dissipation and shortened life. On the low-voltage (LV)-side, exemplary Silicon MOSFET devices can be rated at 100 volts with $R_{DS}$ of 1-2 milliohms or so, with losses in the 0.1 watt range.

The second circuit 115 (also sometimes referred to as an AC circuit or output circuit) can be electrically coupled to the third winding 108 of the transformer 105. The second circuit 115 can comprise an alternating current (AC) port 130 configured to interface with an AC load. As used herein, "AC load" refers to any alternating current source, load, or network, such as an electric utility grid, generator, motor, etc. In any of the embodiments disclosed herein, the AC port 130 can be a single-phase AC port, a three-phase three-wire AC port, a three-phase four-wire AC port, or other AC configuration. As shown in FIGS. 8A-B, the second circuit 115 can further comprise a plurality of half bridge branches, in which each of the half bridge branches can comprise a first reverse blocking switch and a second reverse blocking switch. As also shown in FIG. 8A-B, the second circuit 115 can further comprise an output CL filter 140 in parallel with the AC port 130. The output CL filter 140 can be configured to allow the AC port 130 to interface with the AC load.

In any of the embodiments disclosed herein, the converter can be configured to operate in a plurality of modes to allow electrical energy to flow between one or more of the battery port, the PV port, and the AC port and another of the battery port, the PV port, and the AC port. For example, the plurality of modes can comprise a first mode in which electrical energy is transferred from the PV port 125 to the battery port 120, a second mode in which electrical energy is transferred from the PV port 125 to the AC port 130, a third mode in which electrical energy is transferred from the battery port 120 to the AC port 130, and a fourth mode in which electrical energy is transferred from the AC port 130 to the battery port 120.

The controller can implement the various modes described above through switching cycles controlling the on/off time and sequencing of the various switches in the converter. The converter can operate by "charging" the transformer 105 magnetizing inductance from those sources providing power during a cycle, and then "discharging" the inductor's energy into those sources receiving power during that cycle. The switching sequence can be controlled to reduce switching losses and dv/dt, as well as to manage the energy trapped in the transformer leakage inductance. The principles of leakage energy management are well known to one skilled in the art.

For example, as shown in FIGS. 8A-B, the first circuit 110 can comprise a first bidirectional switch 111 serially connected between the battery port 120 and the second winding 107, a second bidirectional switch 112 serially connected between the battery port 120 and the first winding 106, and a third bidirectional switch 113 serially connected between the PV port 125 and the first winding 106. The converter can be configured to cause electrical energy to flow from the battery port 120 to the first winding 106 during a switching cycle when the second bidirectional switch 112 is in a closed position. The converter can be configured to cause electrical energy to flow from the second transformer winding 107 to the battery port 120 during a switching cycle when the first bidirectional switch 111 is in a closed position. The converter can be configured to cause electrical energy to flow from the PV port 125 to the first winding 106 during a switching cycle when the third bidirectional switch 113 is in a closed position.

As shown in FIGS. 8A-B, the first circuit can further comprise a clamping circuit 145 configured to discharge leakage energy from the transformer 105. This can be performed, for example, by opening (i.e., turning off) the bidirectional switches 111 112 113 in the first circuit during the discharge process.

As depicted in FIG. 8A-B, the first circuit can further comprise an energy recovery circuit 150 configured to recover the discharge leakage energy from the transformer 105 to the battery port 120 with minimum losses. An implementation of such circuit could be realized with a flyback converter.

Figure 9:
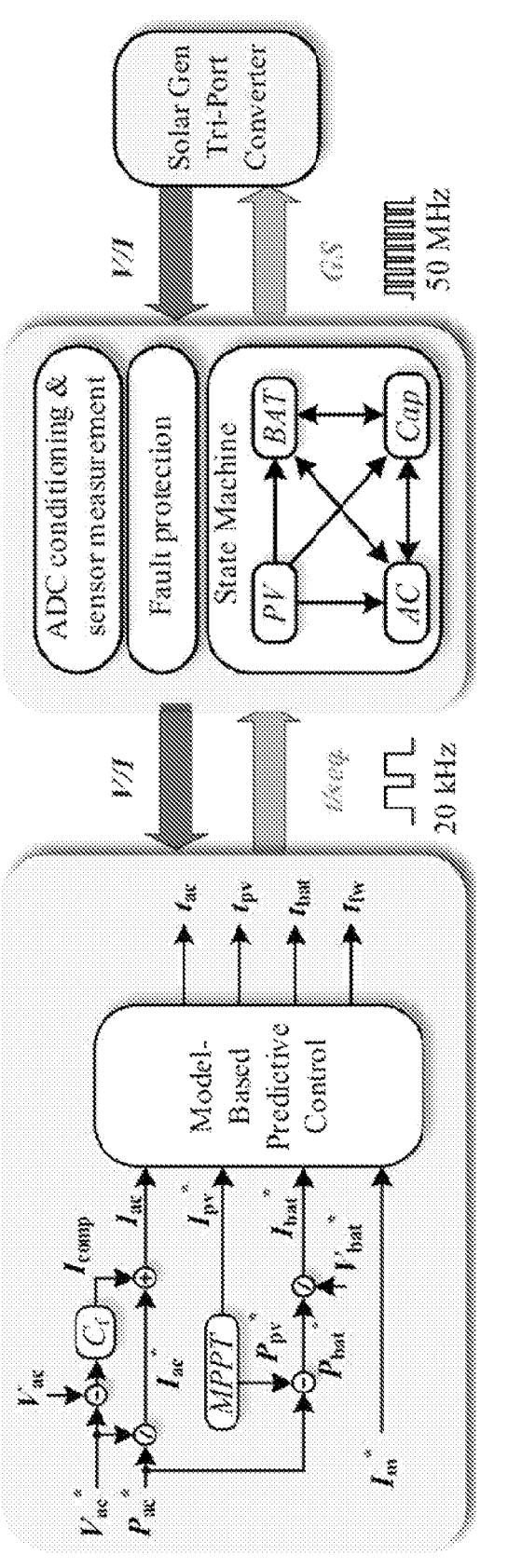
FIG. 9 provides a Solar Gen tri-port converter control scheme, in accordance with an exemplary embodiment of the present disclosure.
Figure 10A:
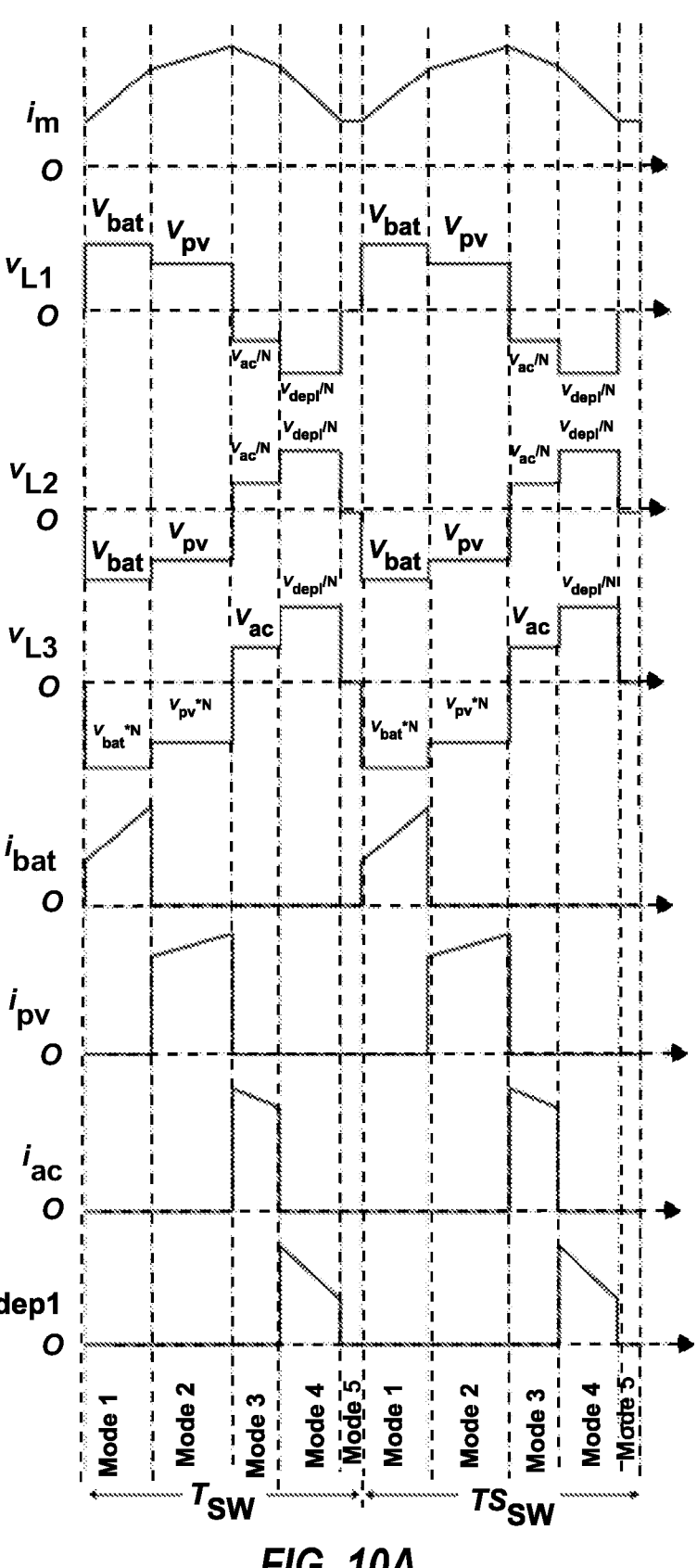
FIG. 10A-B provide plots of characteristic waveforms and simulation waveforms, respectively, for an exemplary Solar Gen tri-port converter of the present disclosure.
Figure 10B:
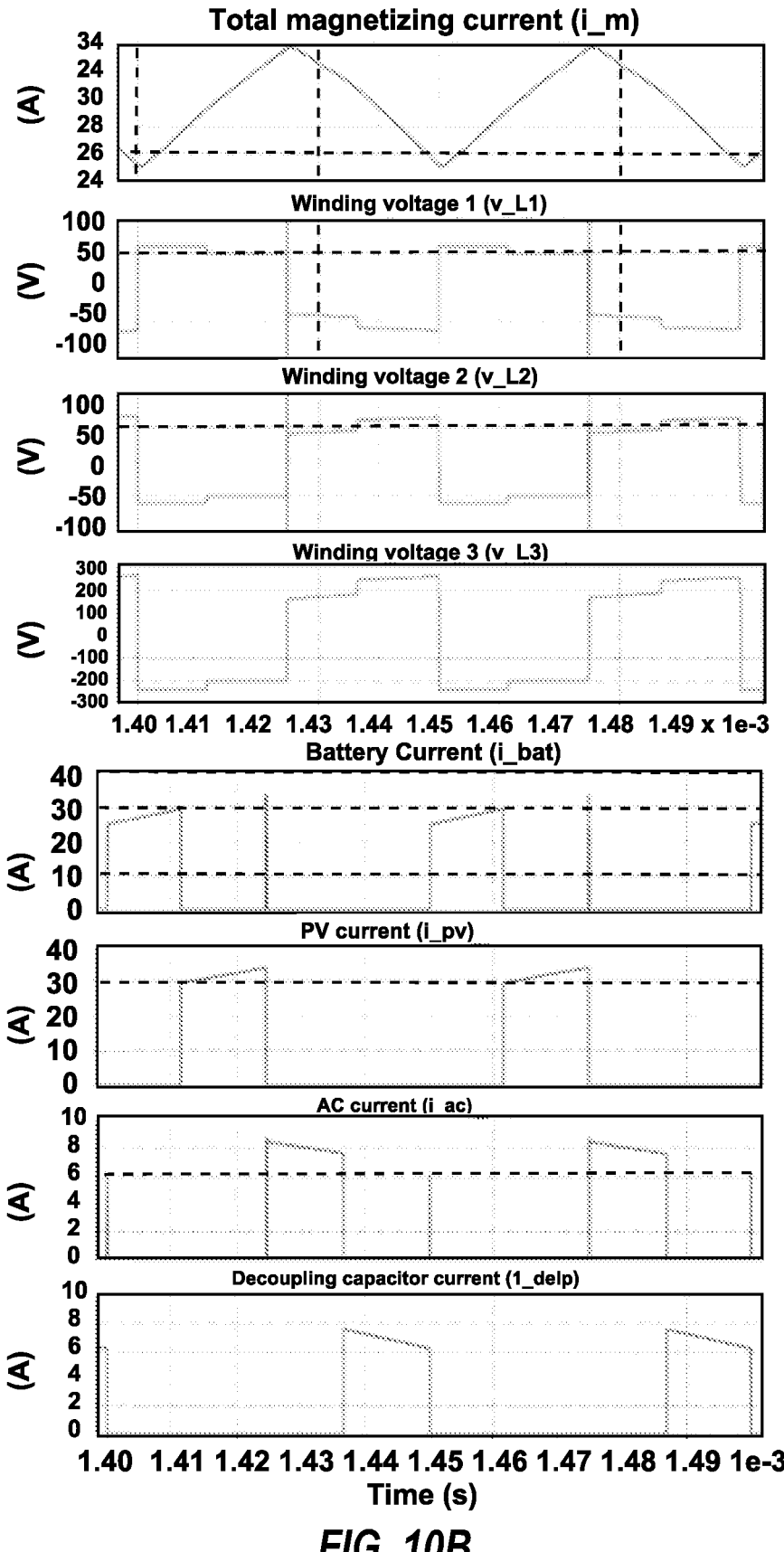
Figures 11A, 11B:
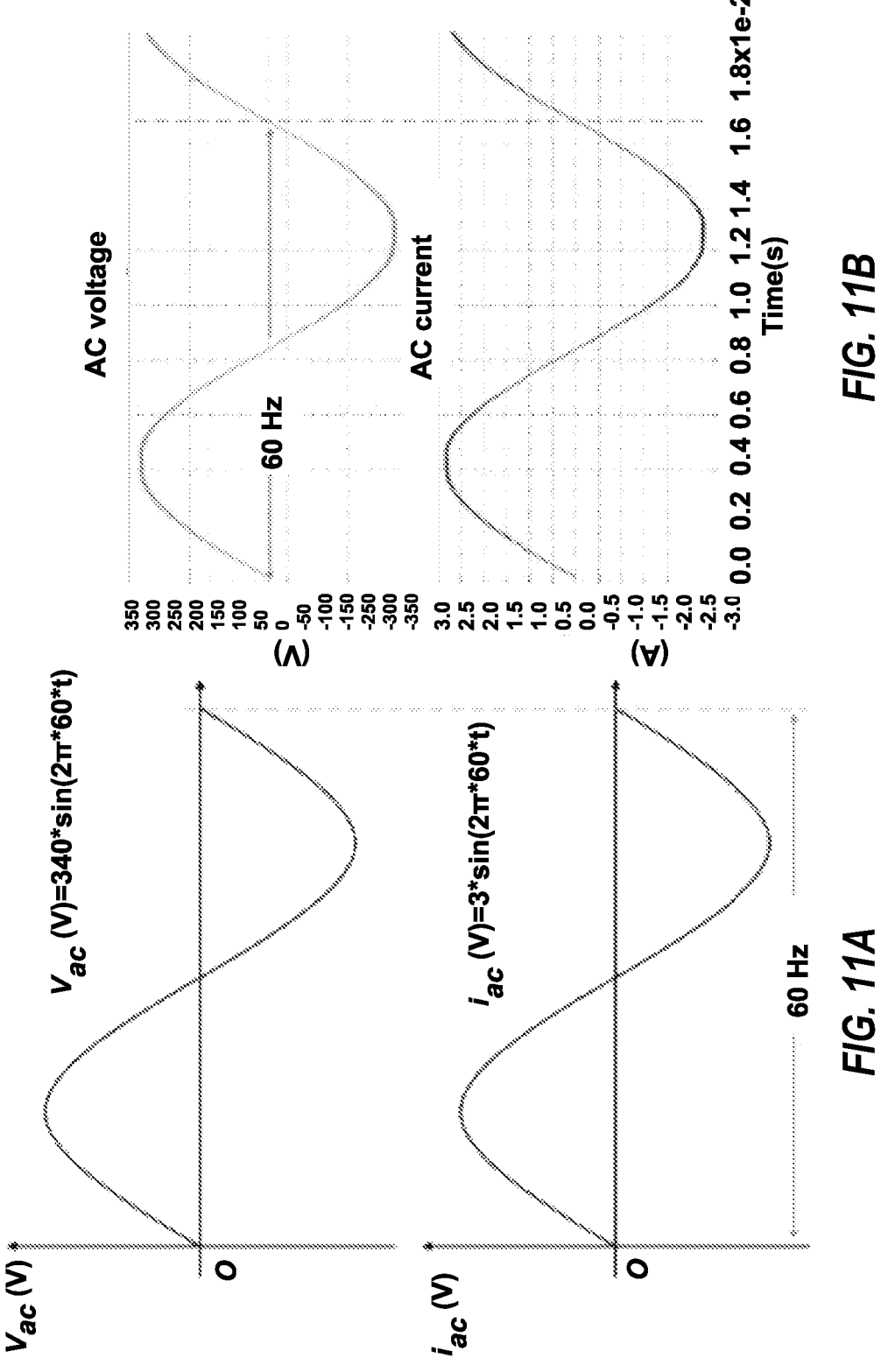
FIGS. 11A-B provide plots of characteristic and simulation single-phase AC waveforms, respectively, for an exemplary Solar Gen tri-port converter of the present disclosure.

FIG. 9 depicts an exemplary high-level preliminary control diagram for the Solar Gen tri-port converter shown in FIGS. 8A-B. The controller can utilize the AC voltage(s) and active powers as references in addition to local measurements to allocate charging times of each port. Subsequently, the gate signals for each switching device can be determined with a specialized state machine. The characteristic waveforms of the magnetizing current ($i_{ti}$), battery current ($i_{bat}$), PV current ($i_{p,}$), decoupling capacitor current ($i_{dpl}$), and the voltage of the high-frequency transformer windings ($v_{L1}$, $v_{L2}$, and $v_{L3}$) for two switching cycles of the exemplary Solar Gen tri-port converter are demonstrated in FIG. 10A, whereas FIG. 10B shows the equivalent simulated waveforms. Lastly, FIGS. 11A-B display the voltage and current characteristic and simulated waveforms from the AC port of the converter when utilizing a single-phase configuration.

Additionally, in some embodiments, the Solar Gen panel can be connected via a secure RF or other communication link (such as using GAMMA) and can provide diagnostic and analytic information to the cloud, enabling system-level optimization and providing maintenance information regarding battery and panel degradation due to environment or wear and tear. This can also allow instructions from the grid operator to be relayed to each tri-port converter, allowing dispatch, frequency regulation, VARs, inertia, etc., as grid services. At the integrated PV farm level, this can allow the "farm" to participate in the overall energy market, unlocking additional value streams. The PV farm can also function as a peaking plant, provide spinning reserve, and can offset the need to run gas plants continuously to provide this functionality. Service calls can be informed and initiated based on maintenance logs in the cloud. Battery replacement can be triggered from the panel itself and can involve a simple process that can be done during service calls while the system is operating.

In some embodiments, protection for each tri-port converter can be integrated within each converter. By way of example, this can be a simple relay and/or intelligent fuse that can be activated when a converter-side fault is detected. Tri-port status can be relayed to the cloud. The wires from each PV string can connect directly to a medium voltage transformer that is, for example, mounted on a distribution network pole (or pad located at the base of the pole and is connected to the medium voltage line through a fuse-disconnect (as is standard practice today). The medium voltage transformer can be monitored, also with a GAMMA type of sensor, which can assess the health of the downstream wires and can also serve as an RF relay point to the cloud. This can provide visibility and control down to the individual panel level, which was previously considered to be prohibitively expensive due to the need to drive cost of the PV panel and inverter continuously down.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way.

What is claimed is:

1. A single-stage, multi-port current source converter comprising:
   a transformer comprising a first winding, a second winding, and a third winding;
   a first circuit electrically coupled to the first and second windings, the first circuit comprising:
      a battery port configured to interface with one or more batteries; and
      a photovoltaic (PV) port configured to interface with one or more PV modules; and
   a second circuit electrically coupled to the third winding, the second circuit comprising:
      an alternating current (AC) port configured to interface with an AC device; and
      a plurality of half-bridge branches, each half-bridge branch comprising a first reverse blocking switch and a second reverse blocking switch;
   wherein:
      during a switching cycle, the current source converter is configured to enable electrical energy to flow between a connected winding selected from the group consisting of the first winding, the second winding, and the third winding and a connected port selected from the group consisting of the battery port, the PV port, and the AC port; and
      during an operating mode, the current source converter is further configured to enable electrical energy to flow between one or more of the battery port, the PV port, and the AC port and another of the battery port, the PV port, and the AC port.

2. The current source converter of claim 1, wherein the AC device is selected from the group consisting of an AC load, an AC source, and an AC network.

3. The current source converter of claim 2, wherein at least one of:
   in a first operating mode, electrical energy is transferred from the PV port to the battery port;
   in a second operating mode, electrical energy is transferred from the PV port to the AC port;
   in a third operating mode, electrical energy is transferred from the battery port to the AC port;
   in a fourth operating mode, electrical energy is transferred from the AC port to the battery port; or
   in a fifth operating mode, electrical energy is transferred from the PV port and the battery port to the AC port.

4. The current source converter of claim 1, wherein the battery port is configured to operate at a voltage level of no more than about 48V.

5. The current source converter of claim 1, wherein the AC port is selected from the group consisting of a single-phase AC port, a three-phase three-wire AC port, and a three-phase four-wire AC port.

6. A current source converter comprising:
   a transformer comprising a first winding, a second winding, and a third winding;
   a first circuit electrically coupled to the first and second windings, the first circuit comprising:
      a battery port configured to interface with one or more batteries;
      a photovoltaic (PV) port configured to interface with one or more PV modules; and
      a bidirectional switch; and
   a second circuit electrically coupled to the third winding, the second circuit comprising:
      an alternating current (AC) port configured to interface with an AC device;
   wherein:
      the bidirectional switch is serially connected to the first winding and the battery port; and
      the current source converter is configured to cause electrical energy to flow from the battery port to the first winding during a switching cycle when the respective bidirectional switch is in a closed position.

7. The current source converter of claim 6, wherein the bidirectional switch is selected from the group consisting of a silicon carbide switch, a silicon switch, and a gallium nitride switch.

8. The current source converter of claim 6, wherein the second circuit further comprises one or more second circuit bidirectional switches, each configured to operate in a reverse blocking mode.

9. The current source converter of claim 6, wherein;
   the first circuit further comprises an additional bidirectional switch serially connected to the second winding and the battery port; and
   the current source converter is configured to cause electrical energy to flow to the battery port from the second winding during the switching cycle when the additional bidirectional switch is in a closed position.

10. The current source converter of claim 6, wherein;
   the first circuit further comprises an additional bidirectional switch serially connected to the first winding and the PV port; and
   the current source converter is configured to cause electrical energy to flow to the first transformer winding from the PV port during the switching cycle when the additional bidirectional switch is in a closed position.

11. A current source converter comprising:
   a transformer comprising a first winding, a second winding, and a third winding;
   a first circuit electrically coupled to the first and second windings, the first circuit comprising:
      a battery port configured to interface with one or more batteries;
      a photovoltaic (PV) port configured to interface with one or more PV modules; and
      a clamping circuit configured to discharge leakage energy from the transformer;
   a second circuit electrically coupled to the third winding, the second circuit comprising:

an alternating current (AC) port configured to interface with an AC device selected from the group consisting of an AC load, an AC source, and an AC network; and an energy recovery circuit connected in shunt with the clamping circuit;

wherein the energy recovery circuit is configured to recover the discharged leakage energy from the transformer and deliver the discharged leakage energy to the battery port.

12. The current source converter of claim 11, wherein the second circuit further comprises a plurality of half-bridge branches, each half-bridge branch comprising a first reverse blocking switch and a second reverse blocking switch.

13. The current source converter of claim 1, wherein;

the second circuit further comprises an output capacitive filter in parallel with the AC; and the output capacitive filter is configured to allow the AC port to interface with the AC device.

14. The current source converter of claim 1, wherein the transformer has a first, second, and third winding ratio of N1:N1:N2.

15. A method comprising:

transferring electrical energy from a battery port of a first circuit of a current source converter to an alternating current (AC) port of a second circuit of the current source converter by closing a first respective bidirectional switch serially connected between the battery port and a first winding of a transformer of the current source converter;

transferring electrical energy from a PV port of the first circuit to the AC port by closing a second respective bidirectional switch serially connected between the PV port and the first winding;

transferring electrical energy from the PV port to the battery port by:

closing the second respective bidirectional; and closing a third respective bidirectional switch serially connected between the battery port and a second winding of the transformer;

discharging, with a clamping circuit of the first circuit, leakage energy from the transformer; and recovering, with an energy recovery circuit, discharged leakage energy from the transformer and transferring the discharged leakage energy to the battery port.

16. The method of claim 15 further comprising:

transferring electrical energy from the AC port to the battery port.

17. The current source converter of claim 1, wherein at least one of:

(i) the first circuit further comprises a first bidirectional switch, a second bidirectional switch, and a third bidirectional switch, wherein:

the second bidirectional switch is serially connected to the second winding and the battery port, such that the current source converter is further configured to cause electrical energy to flow to the battery port from the second winding during the switching cycle when the second bidirectional switch is in a closed position;

the first bidirectional switch is serially connected to the first winding and the PV port, such that the current source converter is further configured to cause electrical energy to flow to the first winding from the PV port during the switching cycle when the first bidirectional switch is in a closed position; and the third bidirectional switch is serially connected to the first winding and the battery port, such that the current source converter is configured to cause electrical energy to flow from the battery port to the first winding during the switching cycle when the third bidirectional switch is in a closed position;

(ii) the first circuit further comprises a clamping circuit configured to discharge leakage energy from the transformer;

(iii) the second circuit further comprises an output capacitive filter in parallel with the AC port, the output capacitive filter configured to allow the AC port to interface with the AC device;

(iv) the transformer has a first, second, and third winding ratio of N1:N1:N2; or (v) the current source converter further comprises an energy recovery circuit connected in shunt with a clamping circuit of the first circuit configured to discharge leakage energy from the transformer, the energy recovery circuit configured to recover the discharged leakage energy from the transformer and deliver the discharged leakage energy to the battery port.

18. The current source converter of claim 6, wherein at least one of:

the first circuit further comprises a clamping circuit configured to discharge leakage energy from the transformer;

the second circuit further comprises half-bridge branches, each half-bridge branch comprising a first reverse blocking switch and a second reverse blocking switch;

the second circuit further comprises an output capacitive filter in parallel with the AC port, the output capacitive filter configured to allow the AC port to interface with the AC device;

the transformer has a first, second, and third winding ratio of N1:N1:N2; or the current source converter further comprises an energy recovery circuit connected in shunt with a clamping circuit of the first circuit configured to discharge leakage energy from the transformer, the energy recovery circuit configured to recover the discharged leakage energy from the transformer and deliver the discharged leakage energy to the battery port.

19. The current source converter of claim 11, wherein at least one of:

(i) the first circuit further comprises a first bidirectional switch, a second bidirectional switch, and a third bidirectional switch, wherein:

the second bidirectional switch is serially connected to the second winding and the battery port, such that the current source converter is further configured to cause electrical energy to flow to the battery port from the second winding during the switching cycle when the second bidirectional switch is in a closed position;

the first bidirectional switch is serially connected to the first winding and the PV port, such that the current source converter is further configured to cause electrical energy to flow to the first winding from the PV port during the switching cycle when the first bidirectional switch is in a closed position; and the third bidirectional switch is serially connected to the first winding and the battery port, such that the current source converter is configured to cause electrical energy to flow from the battery port to the first winding during the switching cycle when the third bidirectional switch is in a closed position;

(ii) the second circuit further comprises a plurality of half-bridge branches, each half-bridge branch comprising a first reverse blocking switch and a second reverse blocking switch;

(iii) the second circuit further comprises an output capacitive filter in parallel with the AC port, the output capacitive filter configured to allow the AC port to interface with the AC device;

(iv) the transformer has a first, second, and third winding ratio of N1:N1:N2; or (v) the current source converter further comprises an energy recovery circuit connected in shunt with the clamping circuit, the energy recovery circuit configured to recover the discharged leakage energy from the transformer and deliver the discharged leakage energy to the battery port.

* * * * *